Figure 1:
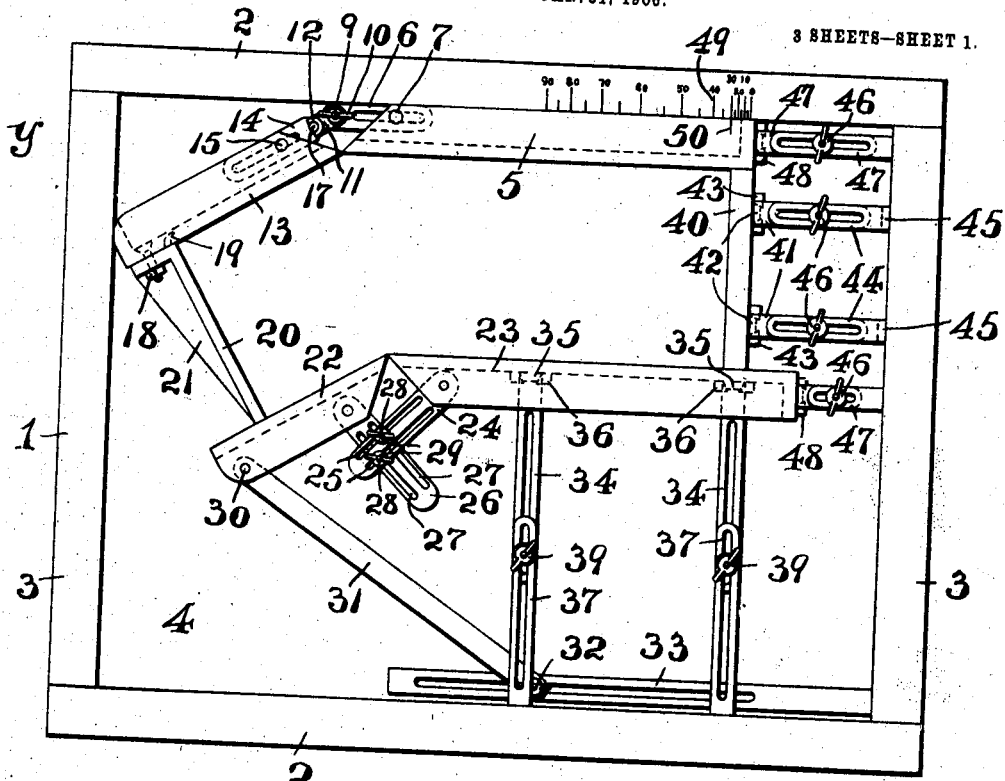

No. 834,573. PATENTED OCT. 30, 1906.
J. P. HALL.
MOLDING DEVICE OR APPARATUS.
APPLICATION FILED JAN. 31, 1906.

3 SHEETS—SHEET 1.

WITNESSES:
Frederick Jamison
Evelyn R. Lesser

INVENTOR:
James P. Hall,
BY
Fred C. Fraentzel,
ATTORNEY

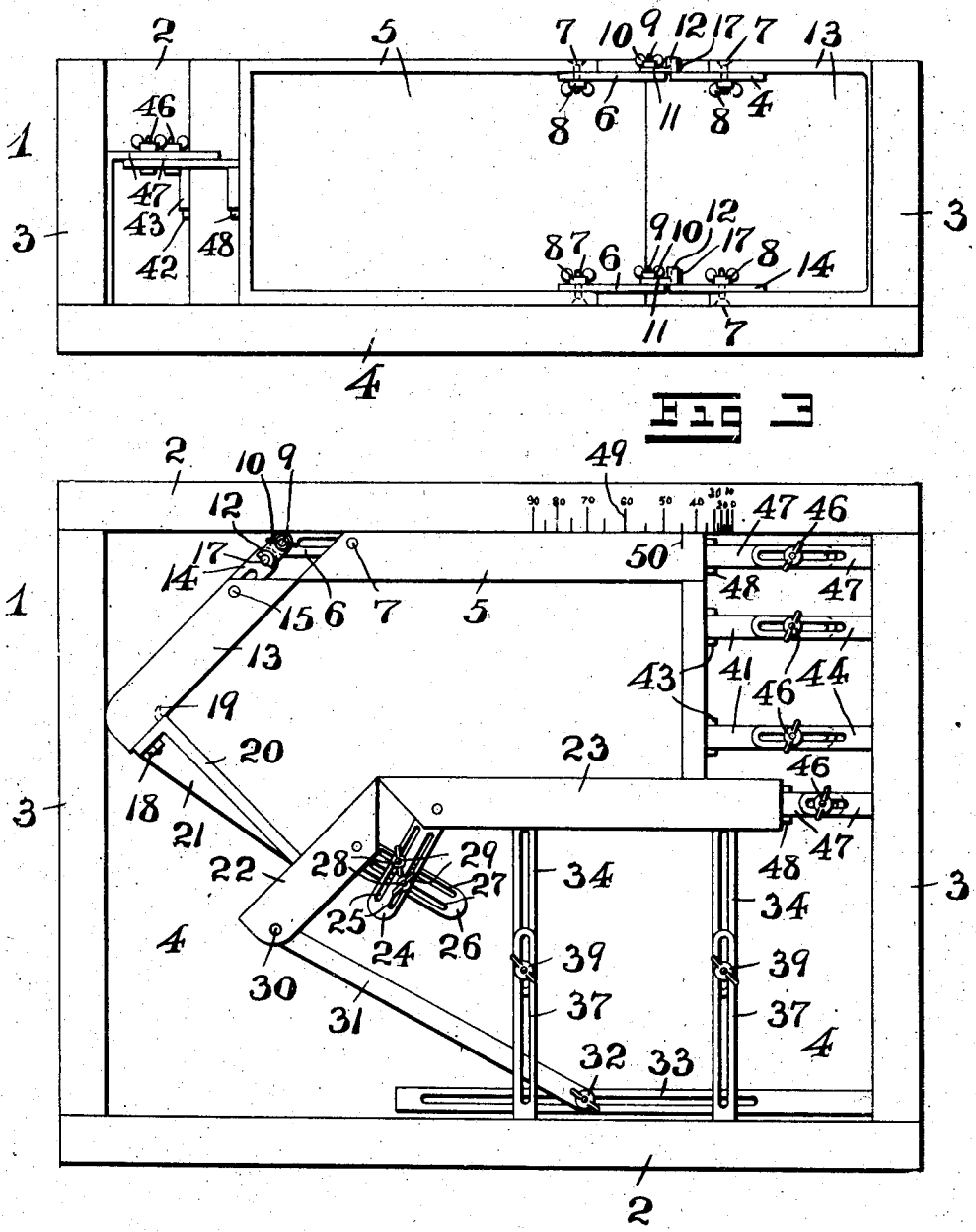

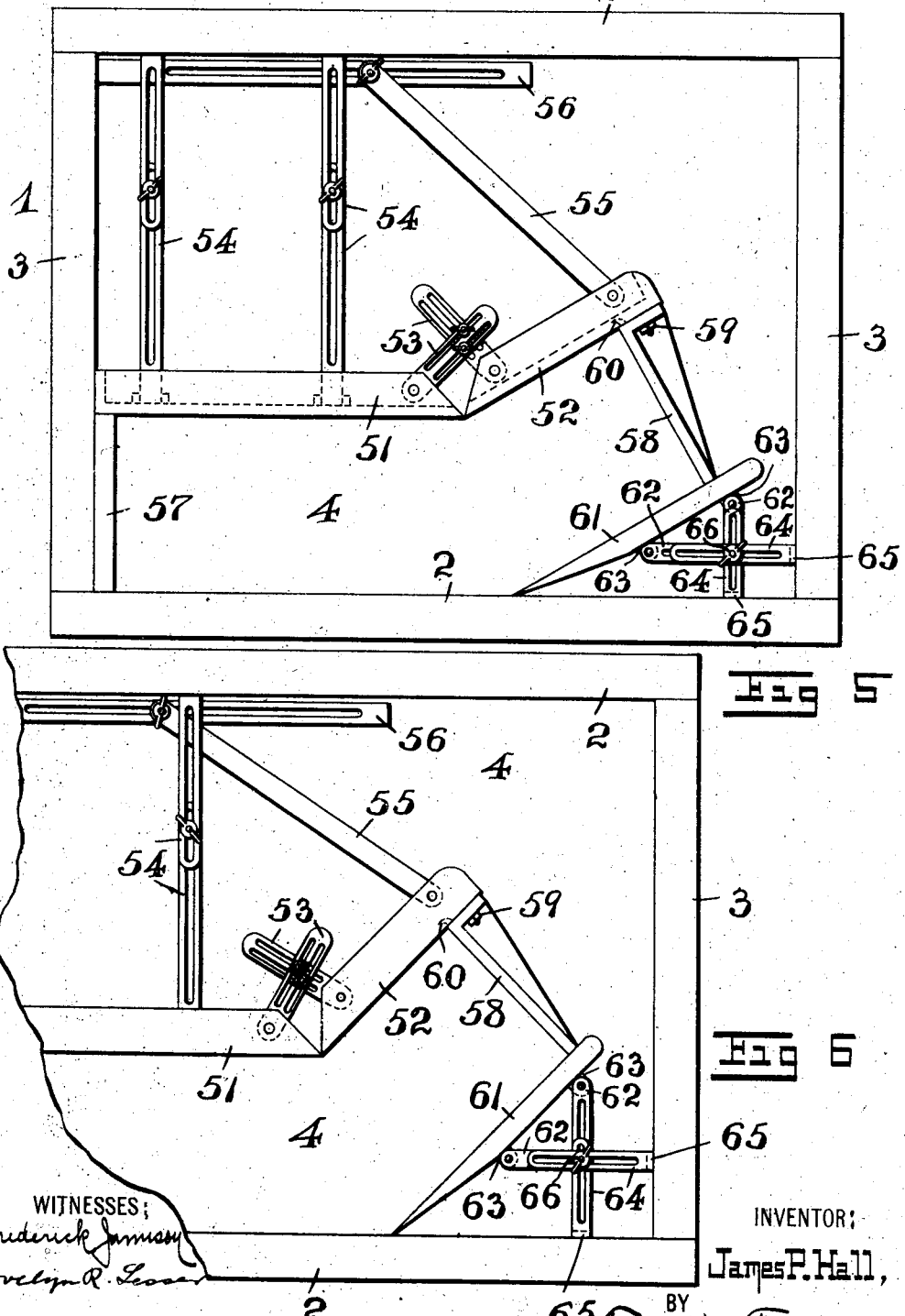

UNITED STATES PATENT OFFICE.

JAMES P. HALL, OF JERSEY CITY, NEW JERSEY.

MOLDING DEVICE OR APPARATUS.

No. 834,573.

Specification of Letters Patent.

Patented Oct. 30, 1906.

Application filed January 31, 1906. Serial No. 298,770.

*To all whom it may concern:*

Be it known that I, JAMES P. HALL, a citizen of the United States, residing at Jersey City, in the county of Hudson and State of New Jersey, have invented certain new and useful Improvements in Molding Devices or Apparatus; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.
This invention has reference to improvements generally in molding devices or apparatus used for the purpose of molding or forming plastic or other suitable material into bricks, building-blocks, or the like, and especially for making concrete bricks or blocks from a mixture of cement and sand; and the invention relates more particularly to a novel device or machine to be used in the manufacture of concrete blocks of the angular type, such as are used in the construction of bay or bow windows and similar architectural structures or details.

This invention has for one of its principal objects the production of a simple, cheap, and efficient molding device for molding concrete angle-blocks and the like which can be easily manipulated and by means of which the work to be performed can be accomplished with a great saving in time and labor and at a greatly-reduced expense.

A further object of this invention is to provide a molding device of the general character hereinafter set forth by means of which concrete angle-blocks and the like of any desired degree of angle may be formed or molded; and a still further object of this invention is to provide a molding device for the purpose of forming or molding any angular degree of concrete angle-blocks or the like, the said mold being provided with a minimum number of working parts which may be readily set up or adjusted to mold the said concrete angle-blocks or the like of any desired angular degree with a great saving of trouble and time in the operation and a consequent saving of expense.

A further important object of this invention is to provide a molding device of the character set forth which is readily adapted to form or mold what I will term for the purposes of this specification either "outside" or "inside" concrete angle-blocks of any desired angular degree.

Other objects of this invention not at this time more particularly mentioned will be clearly evident from the following detailed description of my present invention.

The invention consists, primarily, in the novel molding device or apparatus hereinafter set forth; and, furthermore, this invention consists in the various arrangements and combinations of the devices and parts, as well as in the details of the construction of the same, all of which will be more fully described in the following specification and then finally embodied in the clauses of the claim, which are appended to and which form an essential part of this specification.

This invention is clearly illustrated in the accompanying drawings, in which—

Figure 2:
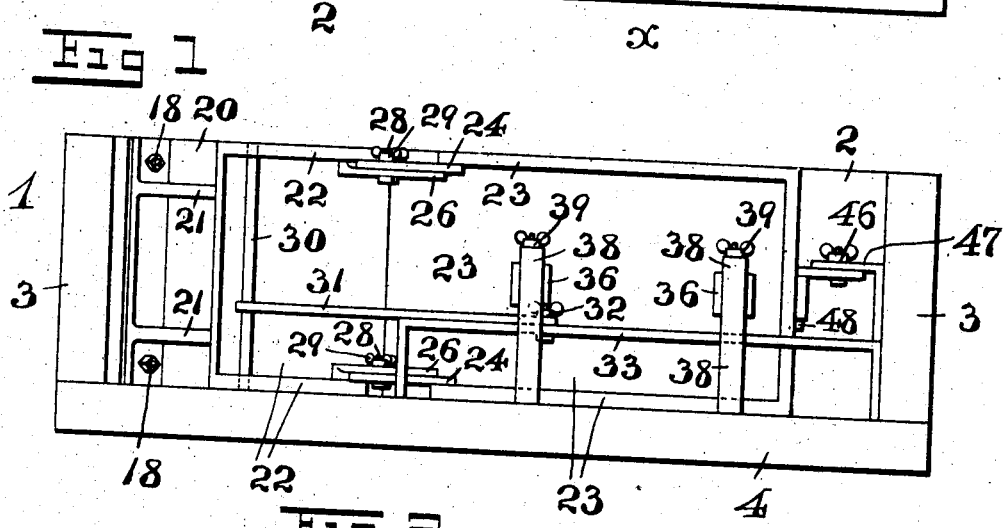

Figure 1 is a top plan view of a suitably-constructed mold-box forming a part of the molding-machine or otherwise and illustrates my improved apparatus for molding concrete angle-blocks or the like, arranged in its operative relation to the said molding-box, and further illustrating the novel apparatus arranged or adjusted to mold or form a concrete angle-block or the like provided with a thirty-degree pitch and forming what is ordinarily termed an "outside" angle-block. Fig. 2 is a side elevation of the apparatus as illustrated in Fig. 1, one of the side walls of the mold-box being removed, looking in the direction of the arrow X. Fig. 3 is a view similar to that shown in Fig. 2, being a side elevation of the novel molding apparatus, but with the opposite side wall of the mold-box removed and looking in the direction of the arrow Y in said Fig. 1. Fig. 4 is a top or plan view such as is shown in Fig. 1, but illustrating the novel molding apparatus arranged or adjusted to mold or form a concrete angle-block or the like provided with a forty-five-degree pitch and forming an outside angle-block. Fig. 5 is a top or plan view such as is shown in Fig. 1, but illustrating the novel molding apparatus arranged or adjusted to mold or form a concrete angle-block or the like provided with a thirty-degree pitch and forming what is termed an "inside" angle-block. Fig. 6 is a view similar to that illustrated in Fig. 5, except that the novel molding apparatus is arranged or adjusted to mold or form a concrete and inside angle-block or the like provided with a forty-five-degree pitch.

Similar characters of reference are employed in the above-described views to indicate corresponding parts.

Referring now to the said drawings, the reference character 1 indicates any well-known form of mold-box adapted to be used upon any type of molding-machine or otherwise, the said box comprising a pair of side walls 2 and a pair of end walls 3, under which is arranged a pallet 4, all in the manner well known in the state of the art to which my present invention appertains.

To form the mold proper in which the concrete angle-block is to be produced, I have provided a removable mold-wall 5 of any suitable conformation, preferably in the shape of a hollow open-end box, as illustrated. This said mold-wall 5 normally is placed contiguous to or abuts against the inner face of one of the side walls 2 of the mold-box 1 and is provided at the end with a pair of slotted and adjustable links or arms 6, the said arms 6 being held in any adjusted position by means of bolts 7. Secured upon the free ends of the slotted links or arms 6 by means of bolts 9 and thumb-nuts 10, so as to swing in a horizontal plane, is an arm, link, or extension-piece 11, having a concave or fork-shaped socket 12 upon its free end. The novel molding apparatus is further provided with a swinging mold-wall 13, also provided at one end with a pair of slotted and adjustable arms or links 14, the said arms or links 14 being held in any adjusted positions by means of bolts 15 and being further provided at their free ends with lugs or cylindrical projections 17, which are adapted to engage with the concave or fork-shaped sockets 12, all for the purpose of providing a holding and joining means for holding the two side mold-walls 5 and 13 at any desired angle to each other. When the two side mold-walls 5 and 13 have been adjusted to the desired degree of the angle of the block of stone desired, the free end of the mold-wall 13 is supposed to abut against the inner face of one of the end walls 3 of the mold-box 1. The said mold-wall 13 has secured upon its free end by means of bolts and nuts 18 and hook-shaped lugs 19, (see dotted outline in Figs. 1 and 4 of the drawings,) adapted to hook into receiving-sockets arranged therefor in the said mold-plate 13; an end mold-wall 20, extending at right angles to the said mold-wall 13 and provided with reinforcing-ribs 21, arranged to give strength and rigidity to the said end mold-wall 20. To form the opposite side mold-walls of the novel molding apparatus, there is provided a swinging mold-wall 22 and a mold-wall 23, adapted to be adjusted and arranged parallel, respectively, to the said mold-walls 13 and 5. For the purpose of providing a joining and holding device to secure the abutting ends of the said mold-walls 22 and 23 in their operative relation there is secured to the end of the mold-wall 23 a pair of oscillating arms or links 24, each of the said arms or links 24 being provided with a pair of parallel slots 25, and to the end of the mold-wall 22 there is secured a similar pair of oscillating arms or links 26, each being also provided with a pair of parallel slots 27. To hold the said arms or links 26 in rigid adjustment, there are provided bolts 28 and thumb-nuts 29. In order to further secure the said mold-wall 22 in its operative relation to the novel molding apparatus, the free end of the said mold-wall 22 is provided with a rod or other fastening means 30, to which is pivotally connected the one end of an arm 31, the other end of the said arm 31 being slidably secured, by means of a bolt and thumb-nut 32, to a slotted bracket 33, said slotted bracket 33 being provided at each end with downwardly-extending arms 34, which rest upon the pallet 4, which forms the bottom of the mold-box 1. The end of the said bracket 33, furthermore, abuts against one of the end walls 3 of the said mold-box 1, substantially as illustrated.

To hold the mold-wall 23 in its proper and operating relation, there are provided a pair of extensible brackets, comprising a pair of slotted bracket arms or links 34, each being provided at one end with a downwardly-extending arm 35, preferably of dovetail conformation and adapted to be received and rigidly held in a pair of receiving-sockets 36. Slidably connected with the said slotted bracket arms or links 34 are other slotted bracket arms or links 37, also provided with downwardly-extending arms 38, the said arms 38 abutting against the inner face of one of the side walls 2 of the said mold-box 1. To hold the said extensible brackets, just described, in their rigid adjusted relation, suitably-arranged bolts and thumb-nuts 39 are employed, substantially as illustrated.

To complete the mold for forming or molding angle-blocks, there is provided an end mold-wall 40, held in its operative relation to the other mold-walls by means of a pair of extensible brackets comprising a pair of slotted bracket arms or links 41, each arm or link being provided at one end with a downwardly-extending arm 42, also preferably of dovetail conformation and adapted to be received and rigidly held in a pair of receiving-sockets 43. Slidably connected with the said slotted bracket arms or links 41 are slotted bracket arms or links 44, also provided with downwardly-extending arms 45, the said arms 45 abutting against one of the end walls 3 of the said mold-box 1. To hold the said extensible brackets just described in their rigid adjusted relations, suitable bolts and thumb-nuts 46 are employed.

The side mold-walls 23 and 5 are rigidly held against any backward or slipping movement by means of extensible brackets 47 of the same character or construction used to retain the above-described end mold-wall 40 in position, the respective extensible brackets 47 engaging, respectively, with the ends of said side mold-walls 23 and 5 by means of receiving-sockets 48, as clearly shown. A scale 49 may be arranged upon one of the side walls 2 of the said mold-box 1, with a corresponding gage indication or notch 50 upon the side mold-wall 5 in order to indicate how far the said side mold-wall 5 must be moved to secure the different angular degrees of the mold-walls 13 and 22 and in consequence thereof of the mold proper.

Referring now more particularly to Figs. 5 and 6 of the drawings, I have illustrated my novel molding apparatus set up and adjusted to form or mold what I term an "inside" angle-block. The apparatus used for the purpose consists of two side mold-walls 51 and 52, the same being joined at their abutting ends by means of the toggle-hinge 53, similar to the joining and adjusting means used to connect the abutting ends of the side mold-walls 22 and 23, previously described. The side mold-wall 51 is held in its rigid and adjusted position by means of a pair of extensible brackets 54, and the side mold-wall 52 is held in like manner by means of the arm 55 and the slotted bracket 56, all of which is arranged and constructed in a manner similar to that already described and as will be clearly understood from an inspection of said Figs. 5 and 6 of the drawings. To form one end mold-wall, the plate 57 is placed against the end wall 2 of the mold-box 1, and to form the opposite end mold-wall the ribbed plate 58 is secured upon the side mold-wall 52 by means of the bolts and nuts 59 and the hook 60 in a similar manner to that previously described in connection with Figs. 1 to 4, inclusive. One of the side mold-walls is formed by the side wall 2 of the mold-box 1, as is evident from an inspection of Figs. 5 and 6 of the drawings, and the other or swinging side mold-wall is formed by the plate 61.

In order to support the plate 61 and adjust it at different angular degrees, I have provided a pair of extensible brackets comprising a pair of slotted members or arms 62, pivotally arranged upon lugs 63 upon the said plate 61, and slidably connected with the said pair of slotted members or arms 62 is another pair of slotted members or arms 64, each member or arm having a downwardly-extending arm 65, which abuts, respectively, against the end wall 3 and the side wall 2 of the said mold-box 1.

To secure the whole in its operative and adjusted relation, I have provided a locking means in the shape of the bolt and thumb-nut 66, thus completing the apparatus for forming or molding concrete angle-blocks or the like of any desired angular degree.

From the foregoing description of my invention it will be clearly seen that I have devised a simply-constructed and efficiently-working molding device or apparatus to produce or mold outside and inside concrete angle-blocks or the like of any desired angular degree. The said novel apparatus can be readily and quickly adjusted and set up to form the angle desired, and the parts or members thereof are easily changed to other angles without the necessity of removing or substituting the various parts to secure the desired result, and, furthermore, to do away with any cumbersome arrangement of parts.

I claim—

1. In a molding device, the combination, with a mold-box, said box comprising a pair of side walls and a pair of end walls, of a mold-wall separably and removably arranged in said box, said mold-wall comprising angularly arranged and adjustable members to provide a mold for the forming of angle-blocks, substantially as and for the purposes set forth.

2. In a molding device, the combination, with a mold-box, said box comprising a pair of side walls and a pair of end walls, of a mold-wall separably and removably arranged in said box, said mold-wall comprising a pair of pivotally-connected members to provide a mold for the forming of angle-blocks, substantially as and for the purposes set forth.

3. In a molding device, the combination, with a mold-box, said box comprising a pair of side walls and a pair of end walls, of a mold-wall separably and removably arranged in said box, said mold-wall comprising a pair of pivotally connected and adjustable members to provide a mold for the forming of angle-blocks, and mechanism connected with said mold-wall for retaining said members in fixed relation to each other after adjustment, substantially as and for the purposes set forth.

4. In a molding device, the combination, with a mold-box, said box comprising a pair of side walls and a pair of end walls, of a mold-wall separably and removably arranged in said box, said mold-wall comprising angularly arranged and adjustable members, and an end wall rigidly connected with one of said members, substantially as and for the purposes set forth.

5. In a molding device, the combination, with a mold-box, said box comprising a pair of side walls and a pair of end walls, of a mold-wall separably and removably arranged in said box, said mold-wall comprising a pair of pivotally-connected members, and an end wall rigidly connected with one of said members, substantially as and for the purposes set forth.

6. In a molding device, the combination, with a mold-box, said box comprising a pair of side walls and a pair of end walls, of a mold-wall separably and removably arranged in said box, said mold-wall comprising a pair of pivotally-connected members, an end wall rigidly connected with one of said members, and adjustable members to provide a mold for the forming of angle-blocks, and mechanism connected with said mold-wall for retaining said members in fixed relation to each other after adjustment, substantially as and for the purposes set forth.

7. In a molding device, the combination, with a mold-box, said box comprising a pair of side walls and a pair of end walls, of a pair of mold-walls separably and removably arranged in said box, each mold-wall comprising angularly arranged and adjustable members to provide a mold for the forming of angle-blocks, substantially as and for the purposes set forth.

8. In a molding device, the combination, with a mold-box, of a pair of mold-walls in said box, each mold-wall comprising a pair of pivotally-connected members to provide a mold for the forming of angle-blocks, substantially as and for the purposes set forth.

9. In a molding device, the combination, with a mold-box, of a pair of mold-walls in said box, each mold-wall comprising a pair of pivotally connected and adjustable members to provide a mold for the forming of angle-blocks, and mechanism connected with said mold-walls for retaining them in fixed relation to each other after adjustment, substantially as and for the purposes set forth.

10. In a molding device, the combination, with a mold-box, of a pair of mold-walls in said box, each mold-wall comprising a set of angularly arranged and adjustable members, and end walls having a fixed relation at their one ends with one set of movable walls; but their other ends having a movable relation with respect to the other set of movable walls, all arranged to provide a mold for the forming of angle-blocks, substantially as and for the purposes set forth.

11. In a molding device the combination, with a mold-box, of a pair of mold-walls in said box, each mold-wall comprising a pair of pivotally-connected members, and end walls having a fixed relation at their one ends with the one set of movable walls, but their other ends having a movable relation with respect to the other set of mold-walls, all arranged to provide a mold for the forming of angle-blocks, substantially as and for the purposes set forth.

12. In a molding device, the combination, with a mold-box of a pair of mold-walls in said box, each mold-wall comprising a pair of pivotally-connected members, and end walls having a fixed relation at their one ends with the one set of movable walls, but their other ends having a movable relation with respect to the other set of mold-walls, all arranged to provide a mold for the forming of angle-blocks, and mechanism connected with said mold-walls for retaining them in their fixed relation after adjustment, substantially as and for the purposes set forth.

13. In a molding device, the combination, with a mold-box, of a pair of mold-walls in said box, each mold-wall comprising a pair of angularly arranged and adjustable members and end walls having a fixed relation at their one ends with one set of angularly-arranged members, but their other ends having a movable relation with respect to the other set of angularly-arranged members, all arranged to provide a mold for forming angle-blocks, means connected with one set of said angularly-arranged members for retaining the members in their adjusted and fixed angular relation, and mechanism connected with one of said end walls to permit of an adjustment of the mold-walls longitudinally in the mold-box; substantially as and for the purposes set forth.

14. In a molding device, the combination, with a mold-box, of a pair of mold-walls in said box, each mold-wall comprising a pair of angularly arranged and adjustable members, and end walls having a fixed relation at their one ends with the one set of angularly-arranged members, but their other ends having a movable relation with respect to the other set of angularly-arranged members, all arranged to provide a mold for forming angle-blocks, means connected with one set of said angularly-arranged members, for retaining the members in their adjusted and fixed angular relation, and mechanism connected with one of said end walls to permit of an adjustment of the mold-walls longitudinally in the mold-box, and means for locking the said mechanism against movement after adjustment, substantially as and for the purposes set forth.

15. In a molding device, the combination, with a mold-box, of a pair of mold-walls in said box, each mold-wall comprising a pair of angularly arranged and adjustable members, and end walls having a fixed relation at their one ends with the one set of angularly-arranged members, but their other ends having a movable relation with respect to the other set of angularly-arranged members, all arranged to provide a mold for forming angle-blocks, means connected with one set of angularly-arranged members for retaining the members in their adjusted and fixed angular relation, and mechanism connected with one of said end walls to permit an adjustment of the mold-walls longitudinally in the mold-box, consisting of slidably-arranged links, each link being provided with a slot, and a bolt and nut in the slots of said links for fixing said mechanism against movement after adjustment, substantially as and for the purposes set forth.

16. In a molding device, the combination, with a mold-box, of a pair of mold-walls in said box, each mold-wall comprising a pair of angularly arranged and adjustable members, and end walls having a fixed relation at their one ends with the one set of angularly-arranged members, but their other ends having a movable relation with respect to the other set of angularly-arranged members, all arranged to provide a mold for forming angle-blocks, means connected with said angularly-arranged members for retaining the members in their adjusted and fixed angular relation, and mechanism connected to one set of angularly-arranged members, to prevent lateral movement, consisting of slidably-arranged links, each link being provided with a slot, and a bolt and nut in the slots of said links for fixing them against movement, substantially as and for the purposes set forth.

17. In a molding device, the combination, with a mold-box, of a pair of mold-walls in said box, each mold-wall comprising a pair of angularly arranged and adjustable members and end walls having a fixed relation at their one ends with the one set of angularly-arranged members, but their other ends having a movable relation with respect to the other set of angularly-arranged members, all arranged to provide a mold for forming angle-blocks, means connected with said angularly-arranged members for retaining the members in their adjusted and fixed angular relation, mechanism connected to one set of angularly-arranged members to prevent lateral movement, consisting of slidably-arranged links, each link being provided with a slot, and a bolt and nut in the slots of said links for fixing them against movement, and mechanism connected with one of said end walls to permit of an adjustment of the mold-walls longitudinally in the mold-box, substantially as and for the purposes set forth.

18. In a molding device, the combination, with a mold-box, of a pair of mold-walls in said box, each mold-wall comprising a pair of angularly arranged and adjustable members and end walls having a fixed relation at their one ends with the one set of angularly-arranged members, but their other ends having a movable relation with respect to the other set of angularly-arranged members, all arranged to provide a mold for forming angle-blocks, means connected with said angularly-arranged members for retaining the members in their adjusted and fixed angular relation, mechanism connected to one set of angularly-arranged members to prevent lateral movement, consisting of slidably-arranged links, each link being provided with a slot, and a bolt and nut in the slots of said links for fixing them against movement, and mechanism connected with one of said end walls to permit of an adjustment of the mold-walls longitudinally in the mold-box, and means for locking said mechanism against movement after adjustment, substantially as and for the purposes set forth.

19. In a molding device, the combination, with a mold-box, of a pair of mold-walls in said box, each mold-wall comprising a pair of angularly arranged and adjustable members and end walls having fixed relation at their one ends with the one set of angularly-arranged members, but their other ends having a movable relation with respect to the other set of angularly-arranged members, all arranged to provide a mold for forming angle-blocks, means connected with said angularly-arranged members for retaining the members in their adjusted and fixed angular relation, mechanism connected to one set of angularly-arranged members to prevent lateral movement, consisting of slidably-arranged links, each link being provided with a slot, and a bolt and nut in the slots of said links for fixing them against movement, and mechanism connected with one of said end walls to permit of an adjustment of the mold-walls longitudinally in the mold-box, consisting of slidably-arranged links, each link being provided with a slot, and a bolt and nut in the slots of said links for fixing said mechanism against movement after adjustment, substantially as and for the purposes set forth.

20. In a molding device, a pair of movably-connected molding-walls, sections and link connections connected with said sections, consisting of a pair of slotted links 6 and 14 and a pivot-bolt and nut for pivotally connecting said links, substantially as and for the purposes set forth.

21. In a molding device, a pair of movably-connected molding-walls, sections and link connections connected with said sections, consisting of overlapping and slotted links pivotally connected with the respective molding-walls, and bolts and nut in the slots of the overlapping links for securing them in fixed relation, substantially as and for the purposes set forth.

22. In a molding device, molding-walls comprising adjustable and movably-connected sections, and an end wall, and link connections connected with the end portions of some of said sections and with the said end wall, consisting of overlapping and slotted links, and bolts and nuts in the slots of the overlapping links for securing them in fixed relation, substantially as and for the purposes set forth.

In testimony that I claim the invention set forth above I have hereunto set my hand this 26th day of January, 1906.

JAMES P. HALL.

Witnesses:
 FREDK. C. FRAENTZEL,
 GEORGE D. RICHARDS.